J. A. BASSETT.

Carbureter.

No. 2,357. Reissued Sept. 18, 1866.

Witnesses:
J. W. Combs
M. M. Livingston

Inventor:
J. A. Bassett
per Munn & Co
Attorneys.

AM. PHOTO-LITHO. CO. N.Y. (OSBORNE'S PROCESS.)

UNITED STATES PATENT OFFICE.

JOHN A. BASSETT, OF SALEM, MASSACHUSETTS, ASSIGNOR TO THOS. D. WORRALL, OF NEW YORK CITY.

IMPROVED PROCESS AND APPARATUS FOR CARBURETING GASES FOR ILLUMINATION.

Specification forming part of Letters Patent No. 34,557, dated March 4, 1862; Reissue No. 2,357, dated September 18, 1866.

*To all whom it may concern:*

Be it known that I, JOHN A. BASSETT, of Salem, in the county of Essex and State of Massachusetts, have invented a new and Improved Process and Apparatus for Naphthalizing or Carbureting Illuminating-Gas and Regulating its Flow to Burners; and I do hereby declare that the following is a full, clear, and exact description of the same, reference being had to the accompanying drawings, and to the letters of reference marked thereon, and which drawings form part of this specification.

The nature of my invention consists, first, in an improved apparatus for charging illuminating-gas with hydrocarbons, so as to effect a more uniform and perfect impregnation of the gas.

It consists, second, in combining with the carbureting apparatus a regulator, so as to produce a more steady flow at the burner, and thus prevent unsteadiness and flickering of the light; and It consists, third, in using improved liquids for carbureting, whereby I prevent the freezing of the liquids, which, heretofore, has rendered most of the attempts to carbonize gas in cold weather ineffectual; and this part of my invention consists in using carbon-spirit for the purpose of carbureting gas or air for illuminating and heating purposes.

Within a short time certain new hydrocarbons, derived from the distillation of petroleum, have become known to commerce. They are variously known as "naphtha," "benzine," and "carbon-spirit." The last term is to be preferred, for the reason that the others have been long known and applied to certain products derived from the distillation of the tar of gas-works.

The advantages of the light liquids from petroleum as carbureting materials are that they are but slightly affected by cold, and do not readily condense or become solid, as do some of the light liquids from gas-tar.

Figure 1:
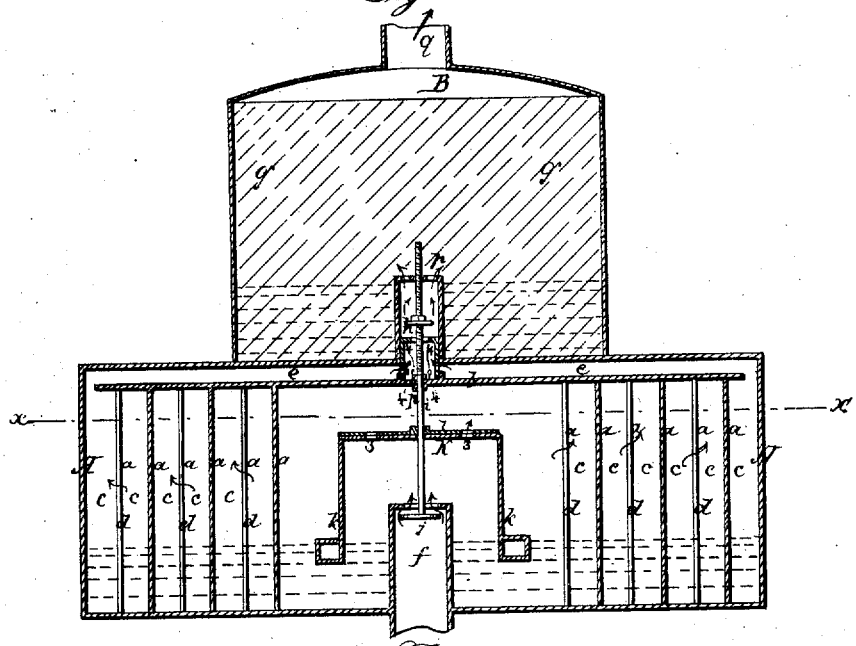
Figure 2:
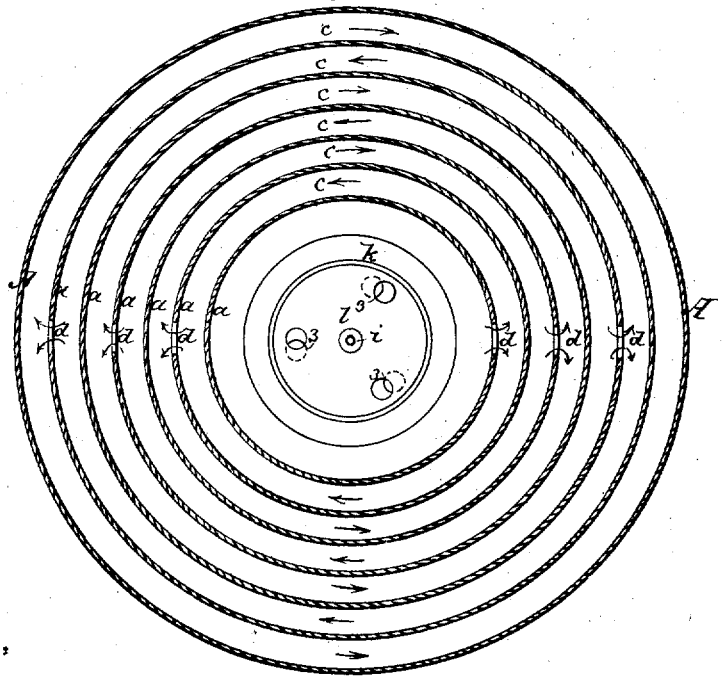

In the drawings, Figure 1 is a vertical section of my apparatus. Fig. 2 is a horizontal section of the same in the plane indicated by the line *x x* in Fig. 1.

Similar letters of reference indicate corresponding parts in the two figures.

This apparatus consists of a vessel containing a series of annular passages arranged concentrically, one within the other, around an upright axis, and communicating with each other on opposite sides alternately, and a second vessel filled with a porous material arranged above the first-named vessel, and communicating therewith by means of an interposed valve attached to the same stem, with an inverted cup-shaped float arranged in the lower vessel, with a valve at the mouth of the inlet, by which the gas enters the latter vessel from the main. Both of the vessels contain naphtha or petroleum-spirits or other volatile hydrocarbons, and the lower vessel serves partly to effect the naphthalizing or carbureting process, but mainly serves as a cooler to cool the gas before its advent to the upper vessel, in which the naphthalizing or carbureting is mainly performed and completed.

The regulation of the flow of gas is effected by the inverted cup and the valve at the inlet, and the valve interposed between the two vessels serves, by nearly shutting off the gas when the liquid in the lower vessel gets very low, to give notice that the said vessel requires replenishing.

To enable others skilled in the art to make and use my invention, I will proceed to describe it.

A is the lower vessel, which we will call the "cooler," of a circular form, which contains a number of upright cylinders, *a a*, arranged concentrically one within the other, and covered by a plate, *b*, to make them form the series of annular passages *c c*.

The cylinders *a a* have openings *d d* on opposite sides alternately, to form communications between the passages *c c*, and to cause the gas entering the vessel A by the central inlet-pipe, *f*, to circulate around the passages *c c*, as indicated by the arrows in Fig. 2, until it arrives at the sides of the said vessels, from whence it is free to pass to the space *e* above the plate *b*.

The inlet-pipe *f*, which brings the gas from the main, projects upward some distance into the vessel, in order that the carbonizing-liquids placed in the vessel for cooling and partly carbureting the gas may not flow down the said pipe. These liquids occupy the lower part of all the passages *c c*, so that the gas, in passing through the vessel A, passes over their whole surface.

B is the upper vessel, which we will term the "carbureter," of cylindrical or other forms, arranged on the top of the cooler A, and filled with a porous substance, *g g*, which is kept saturated with any volatile hydrocarbon liquid by capillary attraction so long as the supply of the liquid is kept up in the vessel.

Various porous substances might be used in the said vessel B; but I prefer to use the compound sometimes used in filters known as "porous carbon." This substance is made of coke, pumice-stone, sawdust, asbestus, and coal-tar mixed and calcined. To make this compound, take, by weight, of cannel coke, twelve (12) parts; pumice-stone, eight (8) parts; asbestus, two (2) parts; sawdust, fourteen (14) parts; coal-tar, four (4) parts. Mix and mold into proper form to fit the interior of the carbureter B, and calcine at a white heat.

*h* is the valve interposed between the cooler and carbureter, opening upward. *i* is the valve-stem, to which is attached the said valve *h*, the gas-regulating valve *j*, and the inverted cup or float *k*. *p p* are guides for the said stem.

The regulating-valve *j* is at the mouth of the inlet-pipe *f*, and opens downward. The cup or float *k* covers the valve *j* and the inlet-pipe *f*, and floats in the carbon-spirit or naphtha in the vessel A.

The gas enters the vessel A through apertures 3 3 3 in the top of the cup *k*, which is fitted with a register-valve, *l*, to give a greater or less amount of opening to the said apertures, according to the supply of gas desired.

The pressure of the gas against the top of the cup *k* tends to lift it, and according as the pressure is less or greater the cup is more or less raised and the opening of the regulating-valve more or less reduced to regulate the supply under variations of pressure.

The valve *h* works in a box, *m*, which stands up within the carbureter B high enough to prevent any of the naphtha or other liquids from flowing down through the said valves. The gas reaches the said valve through openings 4 4 from the space *e*. The said valve is more or less open, according to the quantity of liquid in the lower vessel, A, and when the said quantity becomes so small as to require replenishing the opening of the valve *h* is so far contracted as to reduce the supply of gas to the burners sufficiently to produce a very sensible diminution in the volume of light.

The vessels A B are replenished through suitable openings in the pipes or sides. The gas-outlet pipe *q*, leading to the burner, is on the top of the vessel B.

The cooling process produced by the evaporation of the liquid to which the gas is subject in passing through the cooler A prior to its advent to the carbureter B is of immense advantage, as by cooling to the lowest practicable point before the completion of the carbureting process the said process is more perfectly performed, and no condensation takes place after the gas leaves the carbureter.

I do not claim the vessel A or its contained float *k*; neither do I claim the use of coal-tar naphtha as a carbonizer; but what I do claim as my invention, and desire to secure by Letters Patent, is—

1. The combination, substantially as herein described, of the vessel A, in which the gas passes circuitously over the surface of the hydrocarbon liquids to be partly carbureted and cooled by the evaporation of the liquids, and the vessel B, containing a porous substance and saturated with such liquid, through which the gas subsequently passes, as herein set forth and described.

2. The gas-regulating valve *j* and float *k*, combined with a gas-naphthalizing or carbureting apparatus substantially as herein specified—that is to say, with the float floating in the naphtha or other hydrocarbon liquid used for the carbureting processes.

3. In combination with a carbureting apparatus, a regulator to govern the flow of gas to the burner, substantially as described.

4. The use of carbon-spirit or light products of petroleum for the purpose of carbureting air or of enriching and carbonizing any kind of gas.

JOHN A. BASSETT.

Witnesses:
M. B. MANSFIELD,
THOS. D. WORRALL.